UNITED STATES PATENT OFFICE.

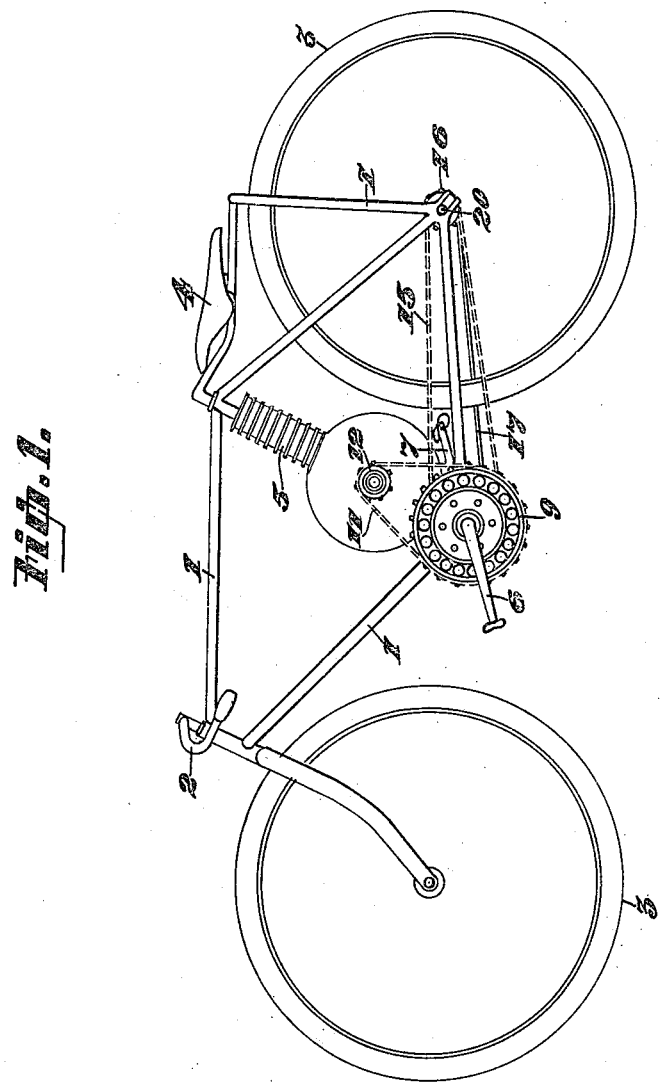

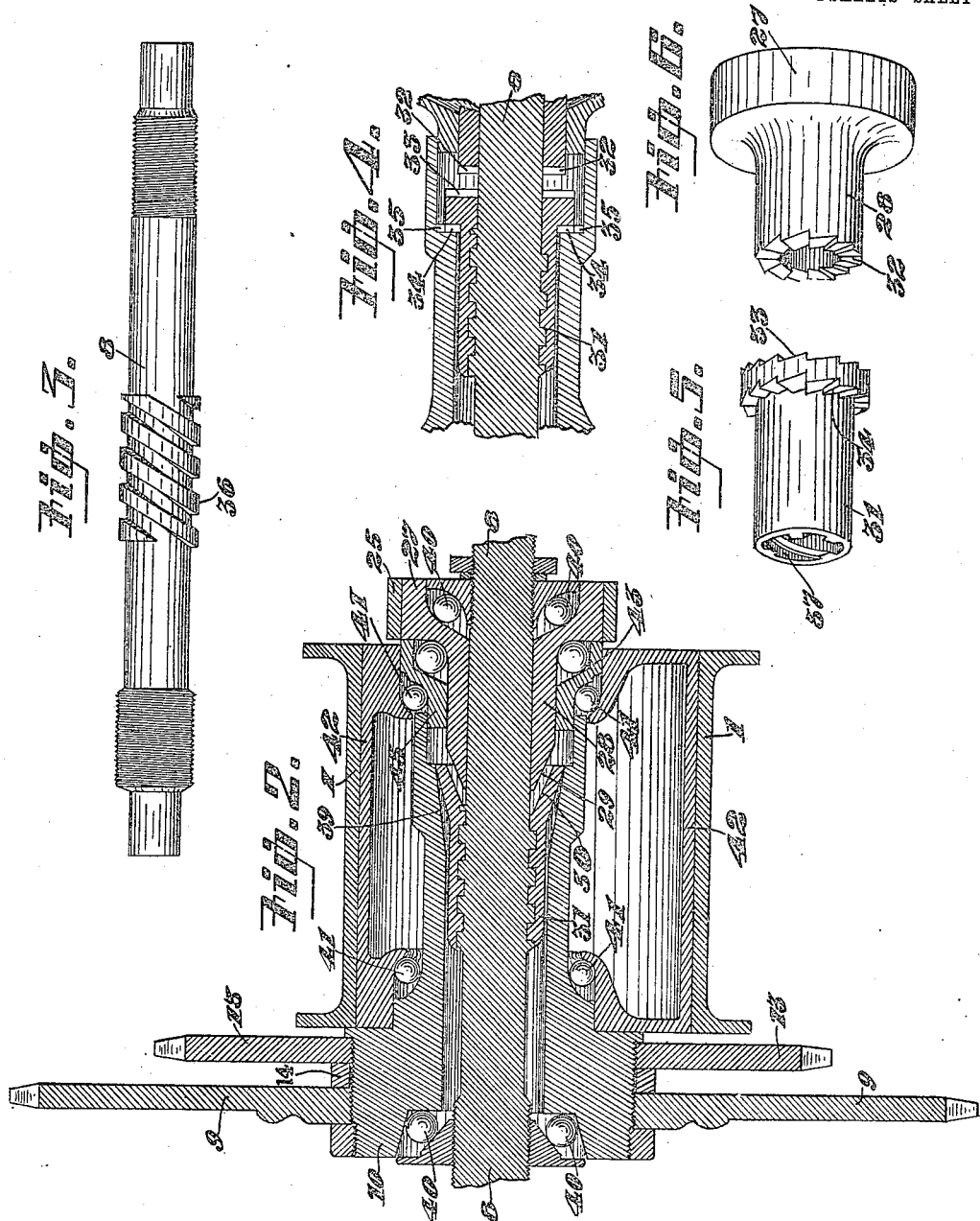

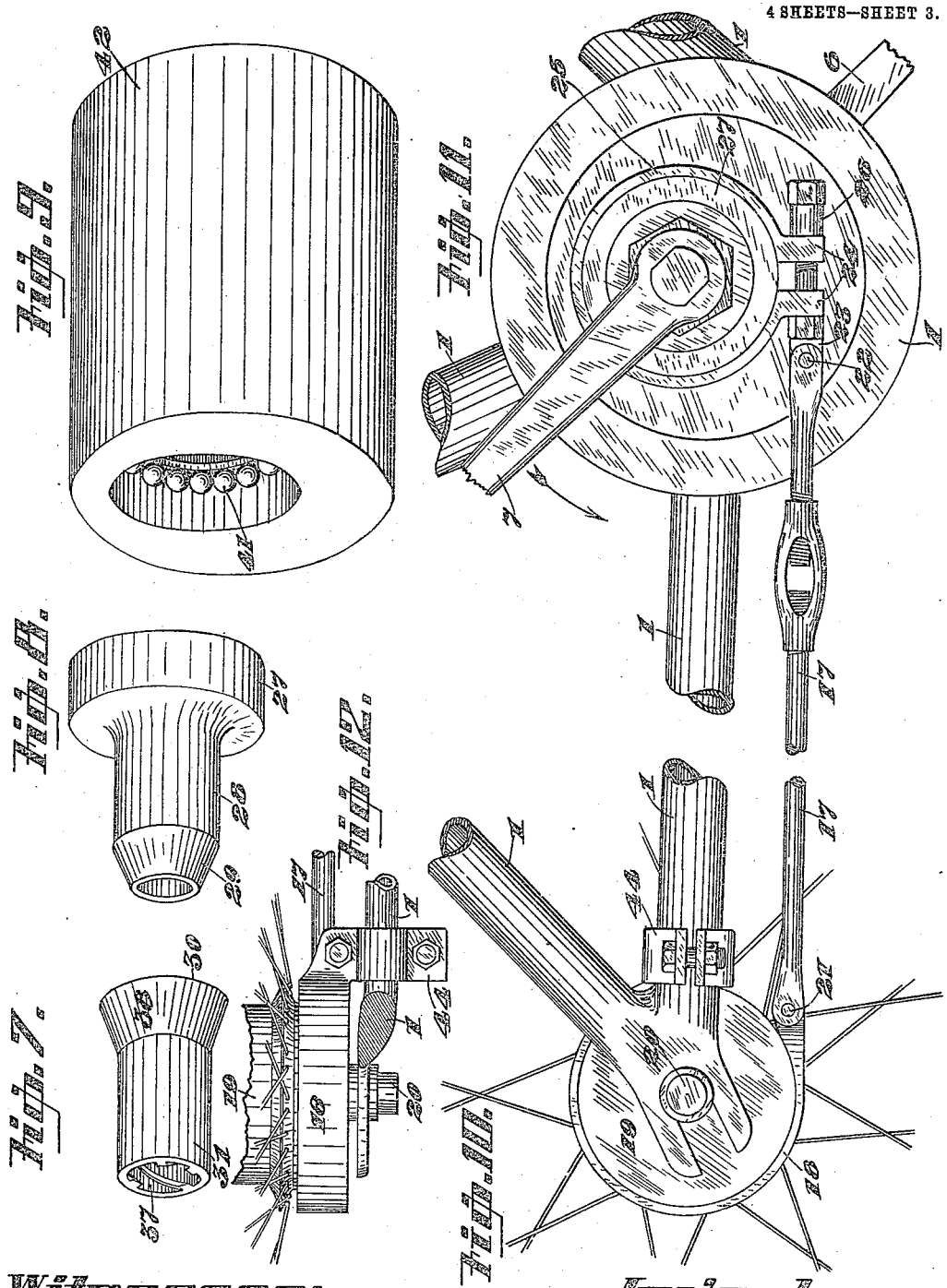

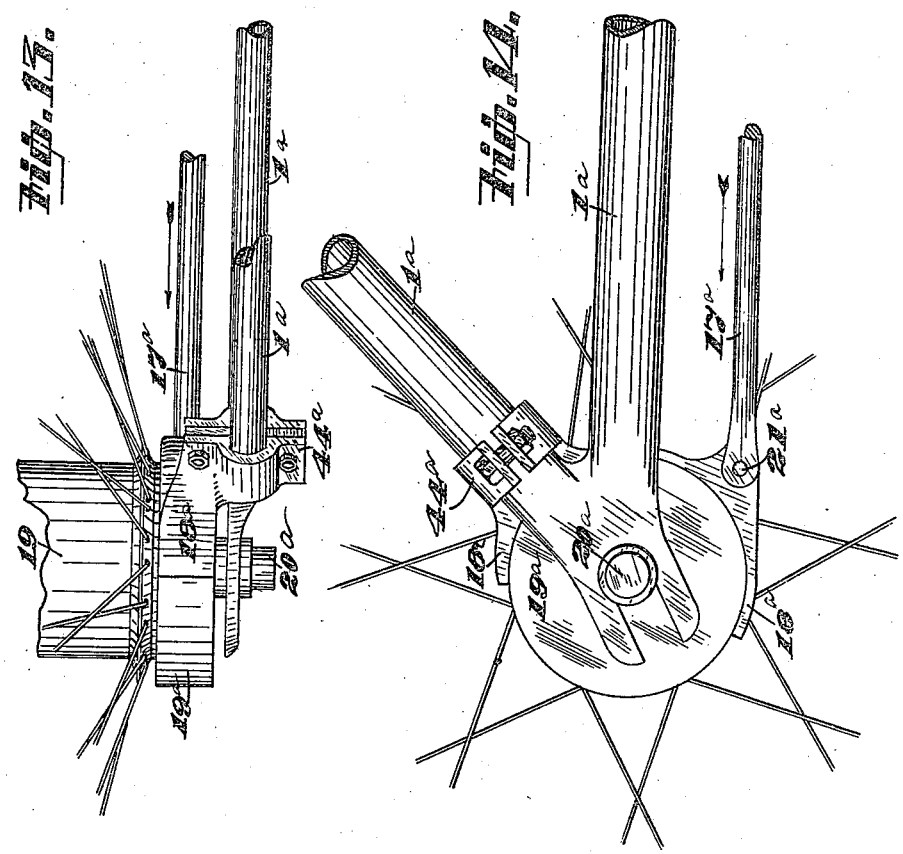

JOHN HURCK, OF ST. LOUIS, MISSOURI.

BRAKE.

949,631.  Specification of Letters Patent.  Patented Feb. 15, 1910.

Application filed October 22, 1908. Serial No. 458,944.

*To all whom it may concern:*

Be it known that I, JOHN HURCK, a citizen of the United States, residing at the city of St. Louis, State of Missouri, have invented certain new and useful Improvements in Brakes, of which the following is a specification, reference being had therein to the accompanying drawing.

This invention consists of a brake particularly adapted for greater efficiency and convenience in connection with what are known as motor cycles.

In the drawings forming part of this specification, in which like numbers of reference denote like parts wherever they occur, Figure 1 is a side elevation of a motor cycle having this improved brake attached thereto; Fig. 2 is a longitudinal sectional view through that part of the brake mechanism located on the crank shaft; Fig. 3 is a detail of the crank shaft; Figs. 4, 5, and 6 are details of a modification of some of the members forming the clutch mechanism; Figs. 7 and 8 are details of the preferred form of same; Fig. 9 is a detail of a sleeve inclosing said clutch mechanism; Fig. 10 illustrates the brake itself in position in connection with the axle of the rear wheel; Fig. 11 shows the means whereby the pedal operates the brake; Fig. 12 is a top plan view in detail of the band brake; and Figs. 13 and 14 illustrate a modification of the band brake in which the brake is applied by pushing instead of pulling.

The cycle frame 1, handles 2, wheels 3, seat 4, and motor 5 may be of any ordinary or preferred kind. The foot-pedals 6 and 7 for starting the machine and operating the brake are rigidly attached to the crank shaft 8, and, when driven forward or backward, cause said shaft to rotate therewith.

The sprocket wheel 9 is mounted on sleeve 10 and (when a motor is attached to the cycle and when said motor is in operation) driven by chain 11 from sprocket 12 actuated by motor 5. Sprocket 13, which is spaced away from sprocket 9 by washer 14, is, also, mounted on sleeve 10, so as to rotate therewith and with sprocket 9, and drives chain 15 and, thereby, sprocket 16, which, in turn, drives the rear wheel. When the foot-pedals are driven forward, sleeve 10 rotates forwardly with shaft 8, and thus causes sprocket 13 to drive chain 15 and sprocket 16, and the machine begins to travel. This rotation of sprocket 13 produces rotation of sprocket 9, chain 11, and connected parts, thus starting the engine. As soon as the engine begins satisfactory operation, foot pedaling may cease.

The brake is applied by back pedaling, which, by means of the instrumentalities hereinafter described, pulls rod 17 forward and, thereby, binds the metal strap 18 tightly upon the hub 19 of the rear wheel, which is loosely mounted on axle 20. The frictional contact of strap 18 upon the hub 19 brakes the machine. When the necessity for braking the machine is at an end, the foot-pedals will be driven forward, and this will release the brake by pushing rod 17 to the rear, same being pivoted at 21 to said strap 18, allowing the flexible strap to lie loosely upon, or with more or less play with relation to, the hub 19. The arrow in Fig. 11 shows the direction of movement of pedal 7 when the brake is being applied. Rod 17 is pivoted at 22 to bolt 23, which passes through openings in lugs 24 on the split ring 25, nut 26 holding ring 25 in engagement with the periphery of boss 27, and, also, slightly adjusting the play of rod 17 by the tightness with which bolt 23 is drawn against lugs 24. If desired, ring 25 need not be used, but, instead of a separate ring, its equivalent may be formed integral with boss 27, integral lugs 24 being, also, used for the attachment of rod 17 by means of bolt 23 and adjusting nut 26. Boss 27 forms the enlarged end of a sleeve 28 terminating in a male friction-cone 29 adapted to coöperate with the female friction-cone 30 in the enlarged end of sleeve 31. Coöperating teeth 32 and 33 may be substituted for the friction-cones 29 and 30 and a construction employed utilizing a sleeve 28ª having a boss 27ª, and a sleeve 31ª provided internally with a female worm 37ª. See Figs. 4, 5, and 6. The teeth 34 coöperate with the teeth 35 on the periphery of one end of the sleeve 10.

When the foot-pedals are being propelled forward, the parts occupy the position shown in Fig. 2, but when, by back pedaling, shaft 8 is caused to rotate backward, the worm 36 thereon coöperates with the female worm 37 within sleeve 31, and thereby causes same to move forward, *i. e.*, to the right in Fig. 2, so that the male and female cones 29 and 30 (or, in the modification shown in Figs. 4, 5, and 6, the teeth 32 and 33) become tightly engaged, at which time the wedge 38, comprising the exterior of female cone 30, is out of engagement with female cone 39 formed near one end of the interior of sleeve 10.

In order that the sleeve 10 may freely rotate around shaft 8, ball-bearings 40 are provided, and in order that it may rotate freely with reference to the frame 1, ball-bearings 41 are provided, the latter being held in place by sleeve 42 located in an opening through frame 1. Ring 43 forms one of the cups for the ball-bearings.

The brake is set by back pedaling, causing shaft 8 to rotate to the rear, and, by means of the worms 36 and 37, causing friction-cones 29 and 30 to coöperate. This rotates boss 27 and lugs 24 in such manner that rod 17 is pulled forward, tightening the strap 18 which encircles hub 19 thereupon. The brake is released by moving the foot-pedals forward, which disengages friction-cones 29 and 30 by means of the reverse action of the worms 36 and 37.

When the motor is in operation, it causes sprocket 9 and sleeve 10 to rotate so much more rapidly than shaft 8 can be driven by foot pedaling that the effect of back pedaling is produced, with the result that wedge 38 is moved slightly away from contact with cone 39, though not so far that engagement between cones 29 and 30 will result.

In Fig. 2 the parts are shown in the position in which, by foot pedaling, shaft 8, through the instrumentality of wedge 38 and cone 39, is propelling sleeve 10 and sprocket 9 forward. Automatically with the continuous operation of the engine when foot pedaling becomes unnecessary, wedge 38 and cone 39 cease to be tightly engaged. When it is desired to apply the brake, positive back pedaling is utilized. Brake 18 is supported by bracket 44 clamped to frame 1.

Sleeve 42 is so constructed that the opening therethrough is eccentric to its periphery. As sleeve 10, shaft 8, and connected parts pass through the opening in said sleeve 42, their position is necessarily eccentric to its circumference. When chain 11 is first placed on sprockets 9 and 12, the opening through sleeve 42 will occupy its highest position, but when said chain becomes somewhat slack, it will be advisable either gradually, from time to time, to turn same toward its lowermost position, so as to take up the slack in said chain, or, if necessary, it may be turned at once to the position in which the opening and parts passing through same occupy the lowermost position possible.

In addition to the adjustment of rod 17 obtained by the tension of nut 26, which is relatively slight in amount, further adjustment thereof in either direction can be obtained when a ring, like ring 25, is used, by means of the position of such ring on boss 27. In other words, if the lugs 24 occupy a position to the left of that shown in Fig. 11, the adjustment of rod 17 will be such as to make the brake 18 looser, and, on the other hand, if lugs 24 be moved to the right and fastened, the adjustment of said brake will be tighter.

While the drawings more particularly illustrate the preferred form of band brake, in which said brake is adapted to be set by rod 17 pulling same forward, yet, as shown in Figs. 13 and 14, it may be so arranged that it will be set by a push from a rod, instead of a pull. In this construction, the frame is designated 1ᵃ, and the wheel is provided with a hub portion 19ᵃ that is operated upon by a brake shoe 18ᵃ, the same being carried by a clamp 44ᵃ mounted on the frame. A push rod, designated 17ᵃ is pivotally connected, as illustrated at 21ᵃ to the brake shoe. It will be evident that if this rod is moved in the direction of the arrow, the brake will be applied.

Having thus described my said invention, what I claim and desire to secure by Letters-Patent is:

1. In a device of the character described, the combination of a crank-shaft, a two-part clutch sleeved on said shaft, one of the parts of said clutch being longitudinally movable, a brake connected to the hub of the rear wheel and with the other part of the clutch, and means carried by the shaft for causing the movable part of the clutch to engage the other part, whereby, by back-pedaling, the brake will be applied.

2. In a device of the character described, the combination of the crank-shaft, a two-part clutch mounted on said shaft, one of said parts being longitudinally movable, a brake adjustably attached to the hub of the rear wheel and connected with the other part of the clutch, and means for causing the movable part to engage said other part, whereby, by back-pedaling, the brake will be applied.

3. In a device of the character described, the combination of a crank-shaft centrally provided with screw-threads, a two-part clutch mounted on said shaft, one of said parts being provided internally with screw-threads engaged by the threads on the crank-shaft and longitudinally moved thereby, and a brake adjustably attached to the hub of the rear wheel and connected with the other part of the clutch, all so constructed and arranged, that by back-pedaling the brake will be applied.

4. In a device of the character described, the combination with a crank shaft provided with spiral threads, and a brake connected with the hub of the rear wheel, of a clutch-member, mounted on said crank shaft, connected with the brake and provided with a frictional engaging surface, a second clutch-member, also mounted on the crank shaft and provided with a frictional engaging surface, said second clutch-member being provided with spiral threads engaged by the spiral threads of the crank shaft whereby said second clutch-member is fed forward to engage the first mentioned clutch on the reverse rotation of said crank shaft, to cause the brake to be applied.

5. In a device of the character described, the combination of a crank shaft, a wheel brake, a clutch member mounted an said shaft and connected with said brake, a second clutch member mounted on said shaft, both clutch members being provided with corresponding coöperating friction surfaces, and interacting means on said shaft and second clutch member for moving the latter bodily along the former into engagement with the first clutch member by reverse rotation of said shaft.

6. In a device of the character described, the combination of foot pedals, a crank shaft rotated thereby, said shaft having a worm thereon, an internally threaded sleeve actuated by said worm, said sleeve having in one end a female friction cone, a male friction cone coöperating therewith, a wheel, a band brake engaging part of said wheel, and means connecting said brake with said male friction cone, for actuating the former from the latter.

7. In a device of the character described, the combination of foot pedals, a crank shaft rotated thereby, said shaft having a worm thereon, an internally threaded sleeve actuated by said worm, said sleeve having in one end a female friction cone, a male friction cone coöperating therewith, a wheel, a band brake that engages part of same, and a rod connecting said brake with said male friction cone.

8. In a device of the character described, the combination of foot pedals, a crank shaft rotated thereby, said shaft having a worm thereon, an internally threaded sleeve having in one end a female friction cone, a male friction cone coöperating therewith, a wheel, a band brake engaging part of said wheel, said male friction cone having a lug projecting therefrom, and a rod held by said lug and connecting said brake with said male friction cone.

9. In a device of the character described, the combination of a sleeve, a crank shaft rotatable therein and provided with a male worm, foot pedals secured to said shaft, a sprocket wheel mounted on said sleeve, a sleeve having an internal female worm engaged by the male worm, and having also an external wedge portion, the first named sleeve having an internal female friction cone arranged for engagement by said wedge-portion to drive said first named sleeve forward when the pedals are driven forward.

In testimony whereof I have affixed my signature in presence of two witnesses.

JOHN HURCK.

Witnesses:
GLADYS WALTON,
EDNA J. GOCKEL.